US006284011B1

United States Patent
Chiang et al.

(10) Patent No.: US 6,284,011 B1
(45) Date of Patent: Sep. 4, 2001

(54) SMOKE EXHAUSTER HAVING DETACHABLE FILTER DEVICE

(76) Inventors: Chao Cheng Chiang; Chi Shyong Chiang, both of P.O. Box 63-99, Taichung (TW), 406

( * ) Notice: Subject to any disclaimer, the term of this patent is extended or adjusted under 35 U.S.C. 154(b) by 0 days.

(21) Appl. No.: 09/454,167

(22) Filed: Dec. 1, 1999

(51) Int. Cl.[7] .................................................. B01D 35/30
(52) U.S. Cl. .................. 55/471; 55/493; 55/504
(58) Field of Search ............................ 55/467, 471, 472, 55/493, 504, 505, 507

(56) References Cited

U.S. PATENT DOCUMENTS 5,840,092 * 11/1998 Rick et al. ............................ 55/472

6,006,534 * 12/1999 Correa ..................................... 62/262

FOREIGN PATENT DOCUMENTS 63-224712 * 9/1988 (JP) ........................................ 55/467

* cited by examiner

*Primary Examiner*—David A. Simmons
*Assistant Examiner*—Robert A. Hopkins

(57) ABSTRACT

A smoke exhauster includes a housing having one or more openings for receiving a filter device each. The filter device includes one or more latches for securing the filter device to the housing. One or more springs are disposed between the filter device and the housing for biasing the latches to engage with the housing and for securing the filter device to the housing. The filter device may be detached from the housing without additional tools. A retainer is pivotally secured to the housing for retaining the side of the filter device opposite to the latches.

5 Claims, 5 Drawing Sheets

SMOKE EXHAUSTER HAVING DETACHABLE FILTER DEVICE

BACKGROUND OF THE INVENTION

1. Field of the Invention

The present invention relates to a smoke exhauster, and more particularly to a smoke exhauster having an easily and readily detachable filter device.

2. Description of the Prior Art

U.S. Pat. No. 5,470,365 to Jang discloses a typical smoke exhauster having a filter device secured to the bottom portion of the hood with fasteners, such that additional tools are required for detaching the filter device from the hood.

The present invention has arisen to mitigate and/or obviate the afore-described disadvantages of the conventional smoke exhausters.

SUMMARY OF THE INVENTION

The primary objective of the present invention is to provide a smoke exhauster including a filter device which may be easily and readily detached from the housing of the smoke exhauster without additional tools.

In accordance with one aspect of the invention, there is provided a smoke exhauster comprising a housing including at least one opening formed therein and including at least one depression formed therein and communicating with the opening of the housing, a filter device received in the opening of the housing and including at least one latch extended therefrom for engaging into the depression of the housing and for securing the filter device to the housing, and means for biasing the latch into the depression of the housing to secure the filter device to the housing.

The housing includes a peripheral wall for defining the opening thereof and includes a peripheral flange extended inward of the opening thereof for supporting the filter device in the opening of the housing.

The filter device includes an upper portion having a fence extended upward there from for confining a grease collected in the upper portion of the filter device within the filter device.

The filter device includes a first side having the latch extended therefrom, and includes a second side opposite to the first side thereof, the smoke exhauster further includes a retainer secured to the housing and engaged in the opening of the housing for receiving the second side of the filter device.

The retainer is pivotally secured to the housing and includes an L-shaped cross section for engaging with the second side of the filter device. The biasing means includes at least one spring provided between the retainer and the second side of the filter device for biasing the latch into the depression of the housing and to secure the filter device to the housing.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
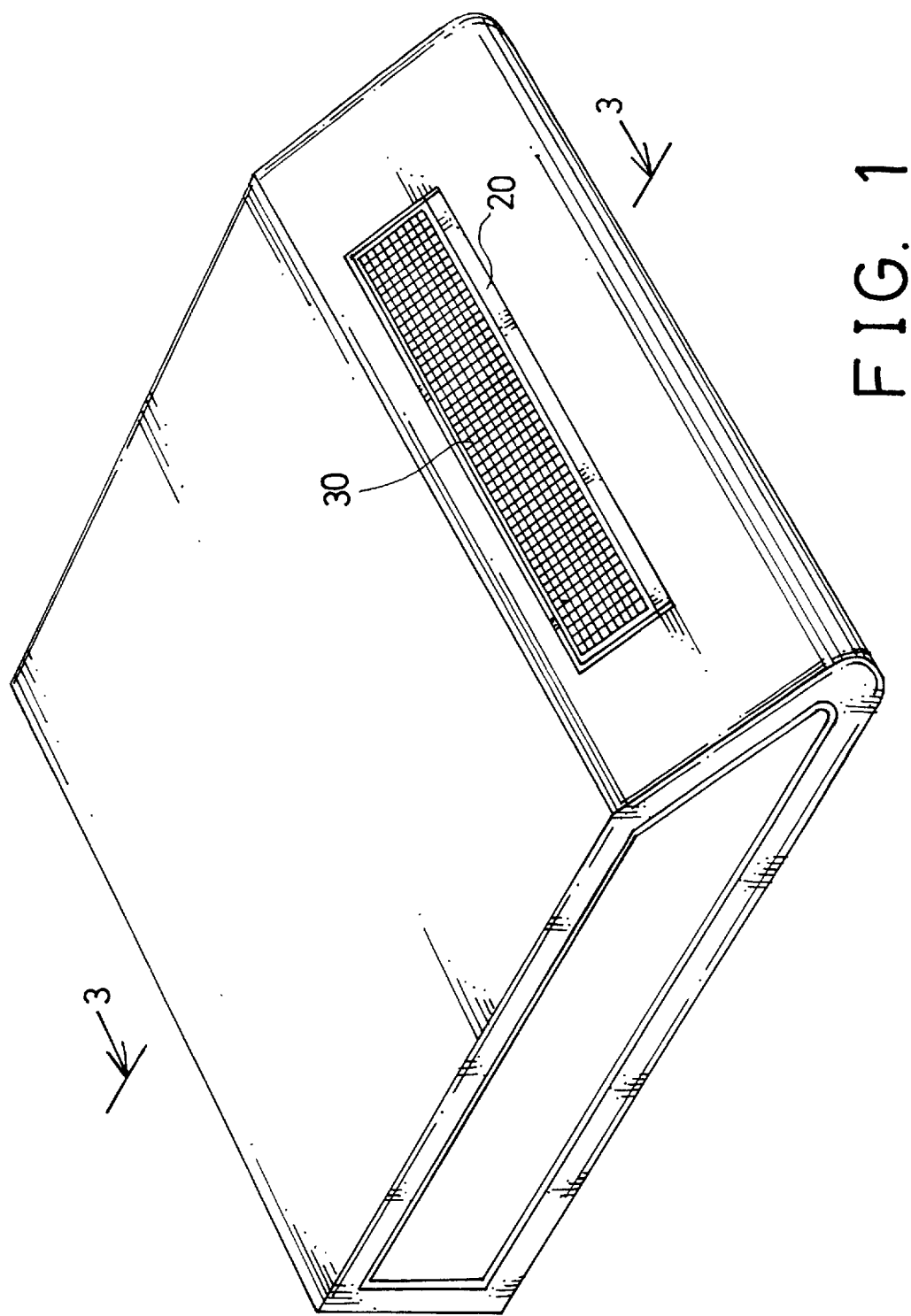
FIG. 1 is a perspective view of a smoke exhauster in accordance with the present invention.
Figure 2:
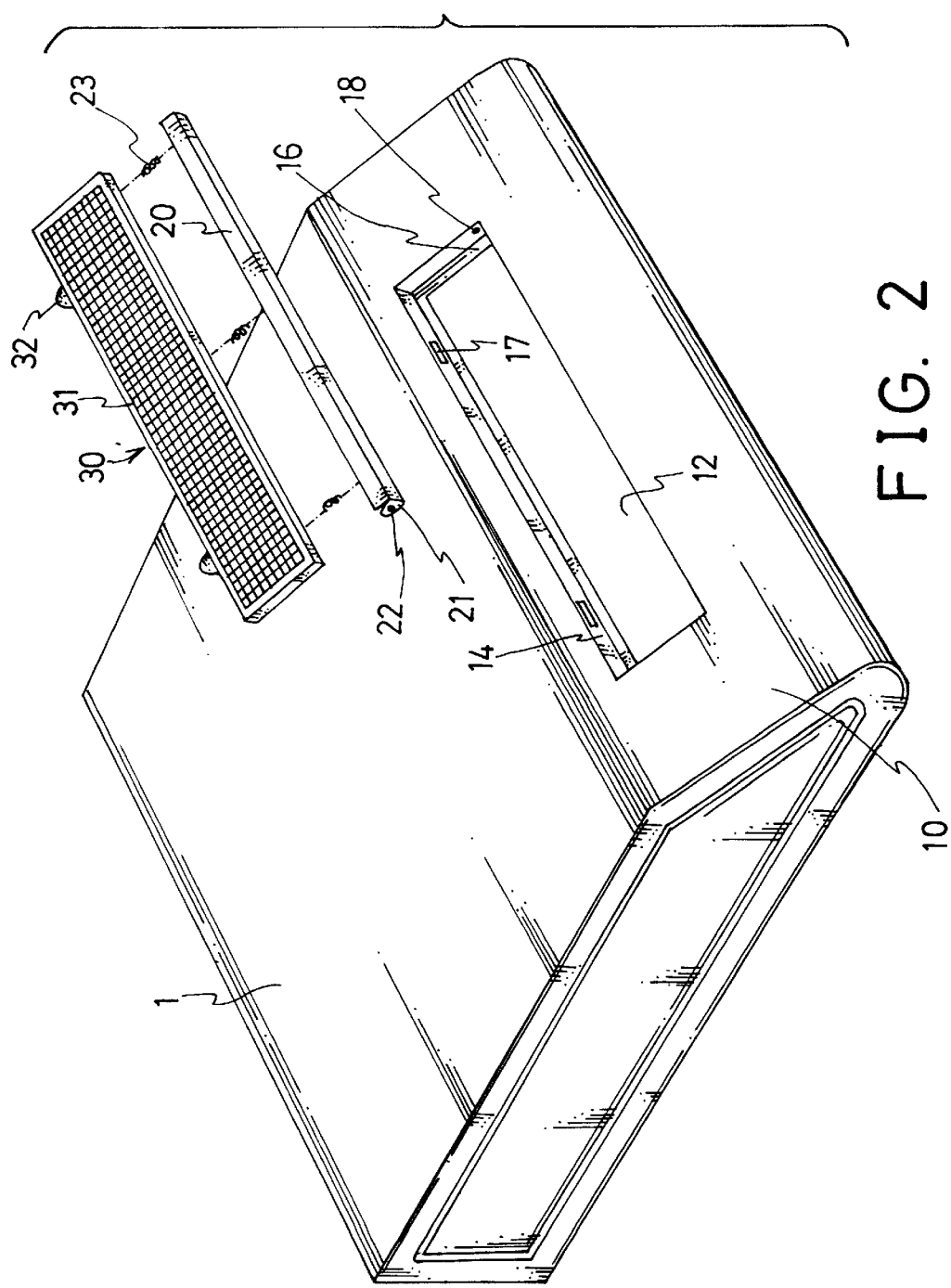
FIG. 2 is an exploded view of the filter device.
Figure 3:
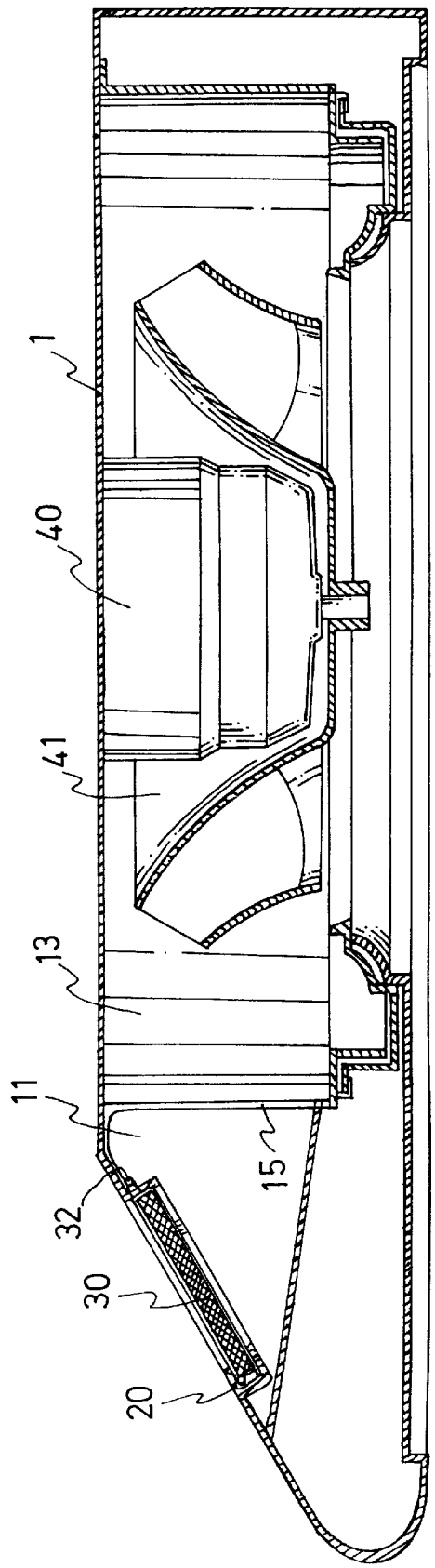
FIG. 3 is a cross sectional view taken along lines 3—3 of FIG. 1.

Referring to the drawings, and initially to FIGS. 1–3, a smoke exhauster in accordance with the present invention comprises a housing 1 including a chamber 11 (FIG. 3) formed therein for receiving and securing a casing 13 therein. One or more motors 40 and one or more fans 41 are secured in the casing 13 for drawing the smoke into the casing 13. The housing 1 includes one or more openings 12 formed therein, and preferably formed in the peripheral portion thereof, each for receiving a filter device 30 therein. The casing 13 includes one or more orifices 15 formed therein and aligned or provided adjacent to the corresponding openings 12 of the housing 1, for allowing the smoke drawn into the casing 13 to flow out of the housing 1 via the orifices 15 of the casing 13 and the openings 12 of the housing 1. The opening 12 as shown in the front inclined portion 10 of the housing 1 is provided for illustrating the attachment of the filter device 30 to the housing 1.

Figure 4:
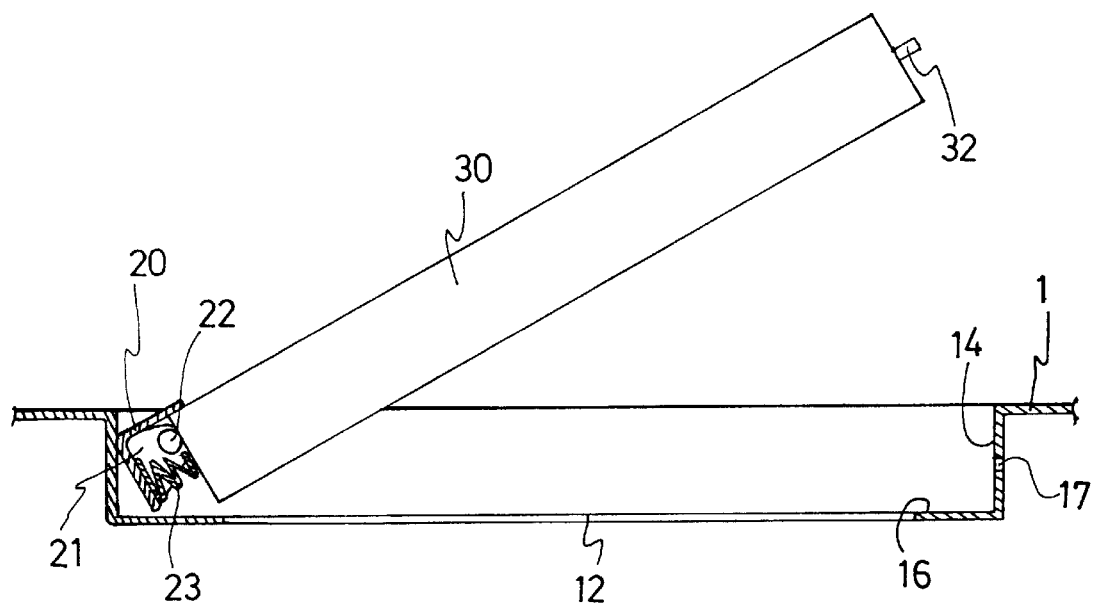
FIGS. 4, 5. 6 are enlarged partial cross sectional views illustrating the attachment of the filter device to the housing of the smoke exhauster.
Figure 5:
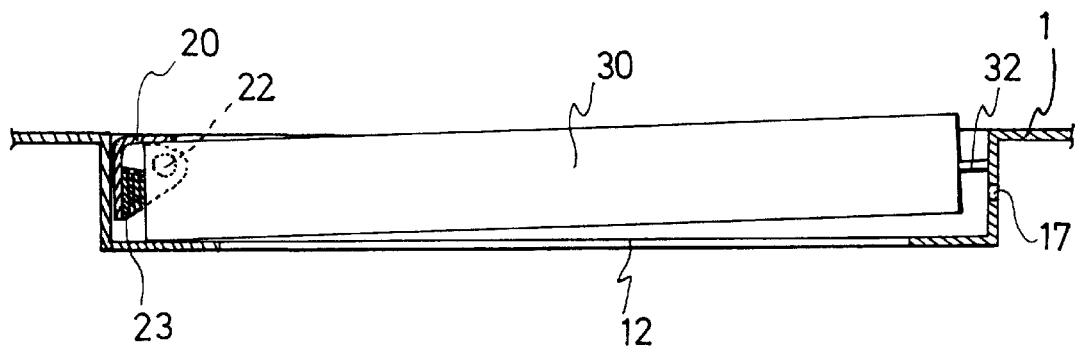
Figure 6:
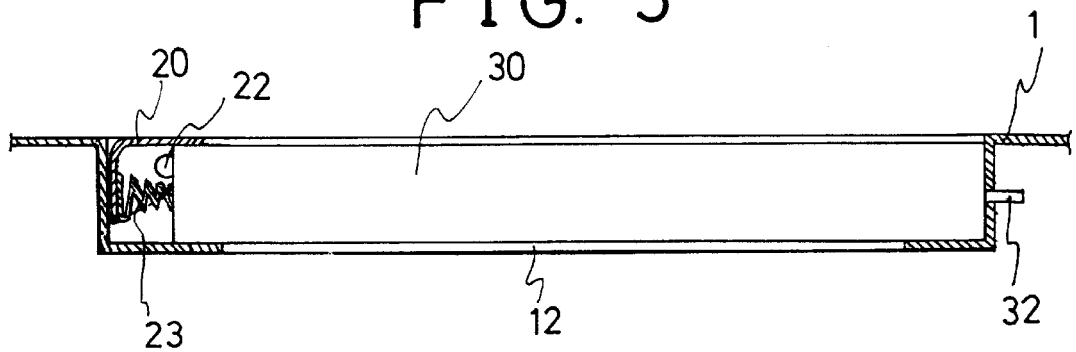

As shown in FIGS. 2 and 4, the housing 1 includes a peripheral wall 14 extended inward of each opening 12 for defining the peripheral portion of the opening 12, and includes a peripheral flange 16 extended inward of the respective opening 12 and perpendicular to the peripheral wall 14 for supporting the filter device 30 within the opening 12 of the housing 1. The peripheral wall 14 includes one or more holes or depressions 17 formed therein, particularly formed in the rear portion thereof and communicating with the opening 12 of the housing 1; and includes a pair of opposite holes 18 formed in the front portions of the sides thereof. A retainer 20 includes an L-shaped cross section (FIGS. 4–6), for example, and for receiving and retaining the filter device 30 in place, and includes two ends 21 each having a pin or projection 22 extended therefrom and rotatably engaged into the respective holes 18 of the housing 1 for pivotally securing the retainer 20 to the housing 1, particularly to the front and lower portion of the inclined front portion 10 of the housing 1. One or more springs 23 are secured in the retainer 20 and engaged with the filter device 30.

Figure 7:
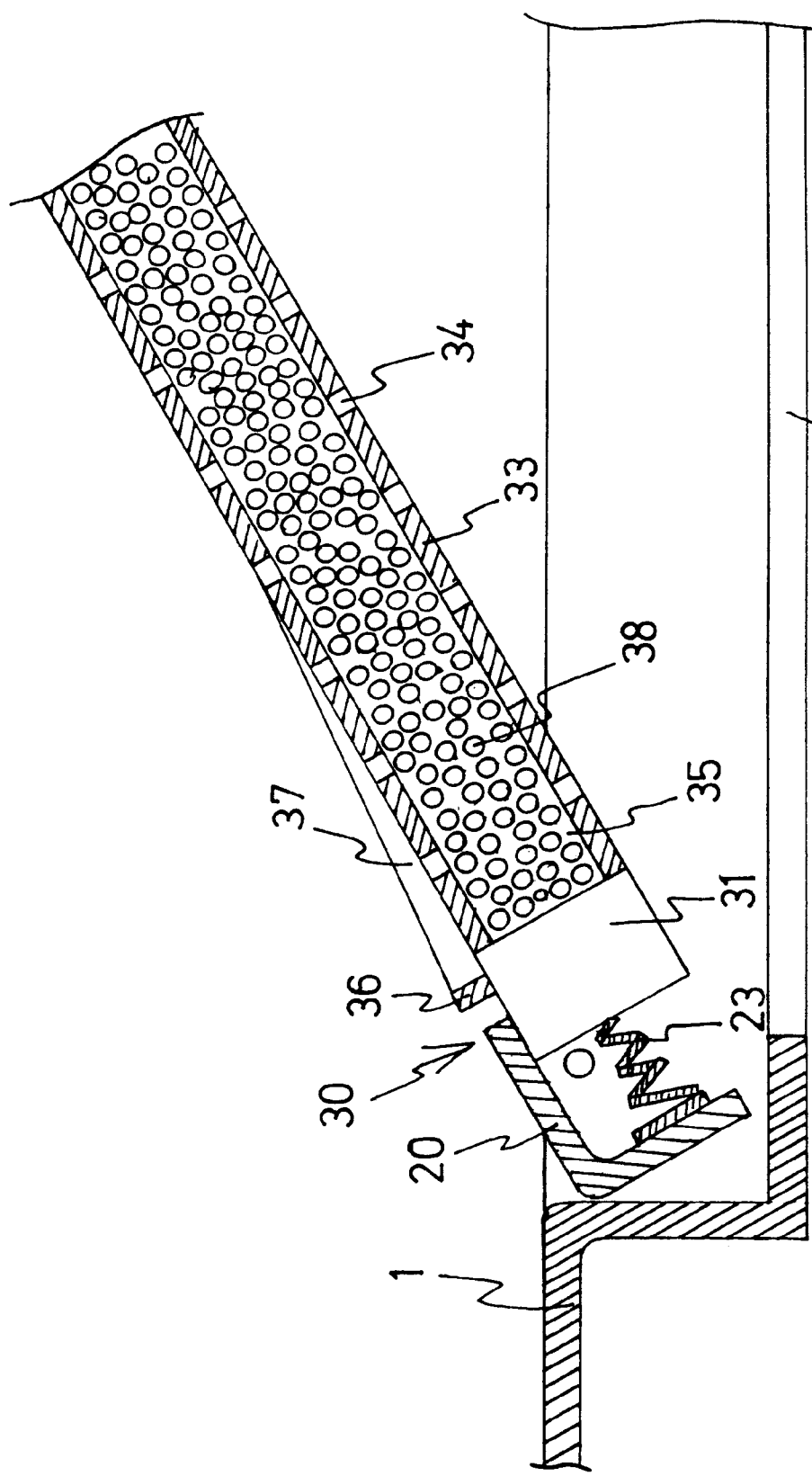
FIG. 7 is an enlarged partial cross sectional view illustrating the application of the filter device of the smoke exhauster.

Referring next to FIG. 7, the filter device 30 includes a peripheral rim 31 and includes an upper and a lower plates 33 for defining a chamber 35 therein and for receiving filter materials 38 therein, such as the active carbon. The plates 33 each includes a number of apertures 34 formed therein for allowing the smoke to flow through the filter materials 38 and to be filtered by the filter materials 38. The filter device 30 includes one or more latches 32 (FIGS. 2–6) extended therefrom, particularly extended rearward therefrom for engaging into the respective depressions 17 and for latching and securing the filter device 30 to the housing 1. The springs 23 may bias the latches 32 into the respective depressions 17 for solidly latching and securing the filter device 30 to the housing 1. Instead of the latches 32, the filter device 30 may include one or more hooks for engaging with the rear portion of the peripheral wall 14 and for securing the filter device 30 to the housing 1.

In operation, the front portion of the filter device 30 may be engaged into the retainer 20 against the spring 23 for aligning the latches 32 to be biased into the respective depressions 17 of the housing 1 and for detachably securing the filter device 30 to the housing 1. When the filter device 30 is moved against the spring 23 for disengaging the latches 32 from the into the depressions 17 of the housing 1, the filter device 30 may be easily detached from the housing 1 without additional tools.

It is to be noted that though the retainer 20 is shown in the drawings, the housing 1 may, alternatively, include a channel formed therein and opposite to the depressions 17 of the housing 1 and communicating with the opening 12 thereof for receiving and retaining the front portion of the filter device 30 in the housing 1; or may include a stopper flange extended inward of the front portion of the opening 12 of the housing 1 for retaining the filter device 30 in the housing 1. Further alternatively, the filter device 30 may include one or more hooks provided in the front portion thereof and opposite to the latches 32 thereof for engaging with the housing 1 and for securing the front portion of the filter device 30 to the housing 1. The latches 32 and the depressions 17 of the housing 1 may also be formed in either of the lateral side portions, instead of being formed in the upper or rear side portion thereof.

As best shown in FIG. 7, the filter device 30 preferably includes an end fence 36 extended upward from the front portion thereof, and/or selectively includes one or more side fences 37 extended upward therefrom and coupled to the end fence 36. The fences 36, 37 include a small size and may not be clearly seen in the other drawing figures such that the fences 36, 37 have not been shown in the other drawing figures. When the filter device 30 is moved against the springs 23 and when the rear portion of the filter device 30 is lifted upward as shown in FIG. 4, the grease or the oil collected in the upper portion of the filter device 30 may be confined within the filter device 30 by the fences 36, 37 and may be guided into the filter device 30 via the apertures 34 of the filter device 30, and may be prevented from flowing out of the filter device 30.

Accordingly, the smoke exhauster in accordance with the present invention includes a filter device which may be easily and readily detached from the housing of the smoke exhauster without additional tools.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

We claim:

1. A smoke exhauster comprising:
    a housing including at least one opening formed therein and including at least one depression formed therein and communicating with said at least one opening of said housing,
    a filter device received in said at least one opening of said housing and including at least one latch extended therefrom for engaging into said at least one depression of said housing and for securing said filter device to said housing, said filter device including an upper portion having a fence extended upward therefrom for confining a grease collected in said upper portion of said filter device within said filter device,
    at least one fan device disposed in said housing for drawing smoke out through said filter device, and
    means for biasing said at least one latch into said at least one depression of said housing to secure said filter device to said housing.

2. The smoke exhauster according to claim 1, wherein said housing includes a peripheral wall for defining said at least one opening thereof and includes a peripheral flange extended inward of said at least one opening thereof for supporting said filter device in said at least one opening of said housing.

3. The smoke exhauster according to claim 1, wherein said filter device includes a first side having said at least one latch extended therefrom, and includes a second side opposite to said first side thereof, said smoke exhauster further includes a retainer secured to said housing and engaged in said at least one opening of said housing for receiving said second side of said filter device.

4. A smoke exhauster comprising:
    a housing including at least one opening formed therein and including at least one depression formed therein and communicating with said at least one opening of said housing,
    a filter device received in said at least one opening of said housing and including at least one latch extended therefrom for engaging into said at least one depression of said housing and for securing said filter device to said housing, said filter device including a first side having said at least one latch extended therefrom and including a second side opposite to said first side thereof,
    at least one fan device disposed in said housing for drawing smoke out through said filter device,
    means for biasing said at least one latch into said at least one depression of said housing to secure said filter device to said housing, and
    a retainer secured to said housing and engaged in said at least one opening of said housing for receiving said second side of said filter device, said retainer being pivotally secured to said housing and including an L-shaped cross section for engaging with said second side of said filter device.

5. A smoke exhauster comprising:
    a housing including at least one opening formed therein and including at least one depression formed therein and communicating with said at least one opening of said housing,
    a filter device received in said at least one opening of said housing and including at least one latch extended therefrom for engaging into said at least one depression of said housing and for securing said filter device to said housing, said filter device including a first side having said at least one latch extended therefrom and including a second side opposite to said first side thereof,
    at least one fan device disposed in said housing for drawing smoke out through said filter device,
    means for biasing said at least one latch into said at least one depression of said housing to secure said filter device to said housing, and
    a retainer secured to said housing and engaged in said at least one opening of said housing for receiving said second side of said filter device,
    said biasing means including at least one spring provided between said retainer and said second side of said filter device for biasing said at least one latch into said at least one depression of said housing and to secure said filter device to said housing.

* * * * *